United States Patent [19]

Morgando

[11] 4,386,551
[45] * Jun. 7, 1983

[54] METHOD AND APPARATUS FOR TEACHING MUSICAL INSTRUMENTS

[76] Inventor: John P. Morgando, 3903 El Conlon, Las Vegas, Nev. 89102

[*] Notice: The portion of the term of this patent subsequent to May 25, 1999, has been disclaimed.

[21] Appl. No.: 112,936

[22] Filed: Jan. 17, 1980

Related U.S. Application Data

[63] Continuation-in-part of Ser. No. 935,345, Aug. 21, 1978, Pat. No. 4,331,061.

[51] Int. Cl.³ .............................................. G09B 15/04
[52] U.S. Cl. ................................ 84/470 R; 84/477 R
[58] Field of Search ............. 84/470 R, 470 P, 477 R, 84/478; 353/90; 35/5, 6, 8 A

[56] References Cited

U.S. PATENT DOCUMENTS

| | | | |
|---|---|---|---|
| 3,026,634 | 3/1962 | Irazoqui | 84/470 |
| 3,358,558 | 12/1967 | Bradley | 353/90 |
| 3,482,480 | 12/1969 | Decker | 84/470 |
| 3,584,530 | 6/1971 | Anderson | 84/470 |
| 3,695,138 | 10/1972 | Anderson | 84/470 |
| 3,817,144 | 6/1974 | Okamoto | 84/470 |
| 3,895,555 | 7/1975 | Peterson et al. | 84/470 |

*Primary Examiner*—Stafford D. Schreyer
*Attorney, Agent, or Firm*—Romney, Golant, Martin, Disner & Ashen

[57] ABSTRACT

Method and apparatus for simultaneously teaching a plurality of students how to play a musical instrument including programmed audio-visual instruction by prerecorded audio inputs, prearranged note combinations displayed on a student light strip, confirmation of right or wrong answers on periodic quiz questions, seqential pictures projected on a screen and correlated printed lesson materials, which programmed inputs may be stopped by the teacher in order to selectively instruct certain students by broadcasting oral instructions, and by playing a master keyboard which activates the student light strip. A teacher's console for collectively monitoring the student quiz results, and for selectively listening to individual student musical performances during the programmed instruction period. Apparatus for processing pre-recorded audio inputs on one channel of a master tape, and digital commands on a second channel for activating the instrument light strip, alternating picture projectors, and quiz answer display panels.

1 Claim, 13 Drawing Figures

METHOD AND APPARATUS FOR TEACHING MUSICAL INSTRUMENTS

This is a continuation-in-part of application Ser. No. 935,345 filed Aug. 21, 1978, which is now U.S. Pat. No. 4,331,061.

The invention relates generally to audio-visual programmed teaching of musical instruments and more specifically to a method and apparatus for simultaneously teaching a group of students how to play a musical instrument by having an instructor monitor the individual student progress in order to provide supplemental instruction to certain of the students.

Program teaching has provided a way for maintaining high standards of teaching while at the same time enabling students to progress rapidly in the course of learning a new skill such as playing a musical instrument. A typical prior art method and apparatus for teaching a musical instrument through programmed lessons featuring an instrument light strip is disclosed in U.S. Pat. No. 3,482,480 issued Dec. 9, 1969 for Teaching Apparatus For Keyboard Instruments. However, the aforesaid prior art patent is limited to teaching students one at a time, with a single console serving both the instructor and the student.

Accordingly, it is an object of the present invention to enable one instructor to teach simultaneously a group of students a programmed audio-visual lesson, while at the same time enabling the instructor to monitor and provide individualized audio and visual inputs to certain students during the course of a programmed lesson.

More specifically, it is an object of the present invention to enable the instructor to selectively listen to each student's musical performance, collectively monitor each student's programmed quiz results, and periodically stop the programmed teaching course in order to broadcast oral instructions to certain students as well as activate certain student light strips by playing the master keyboard at the teacher's console. In addition, it is an object of the present invention to enable the teacher to follow along and view all features of the programmed teaching course concurrently with the students, including pictorial illustrations and diagrams projected by a film projector unit and visual indicia of musical notations and concepts displayed as in printed course materials supplied to each student.

A further object is to provide a multi-track tape which carries the pre-recorded audio portion of the program lesson on one channel, and which carries coded information in digital form on the second channel for purposes of activating the student light strips in pre-arranged note combinations, advancing and dissolving back and forth between two sets of slide pictures, and confirming visually the correct or incorrect status of student answers to periodic quiz questions.

A specific object of the present invention is to provide apparatus in the form of an improved musical instrument teaching system for the simultaneous instruction of a plurality of students comprising a plurality of student stations (each having his own keyboard and keyboard display indicating by means of lights which keys on the keyboard he is to play at that point of the lesson), a screen for providing pre-programmed visual instructional material to the students, and a sound transducer for providing preprogrammed audio material instructional material to said students, all under the control of a teacher's console having an automatic and a manual mode of operation. In the automatic mode, a preprogrammed sequence of control data determines for any given moment of time (1) what visual instructional material is visible on said screen, (2) what audio instructional material is audible through said transducer, and (3) what combination of display lights are activated at said student stations. In the manual mode, a teacher seated at said teacher's console may (1) select the particular visual material, if any, to be shown on said screen, (2) determine the combination of display lights, if any, to be illuminated at each of said student stations, and (3) communicate orally with all of said students individually or as a group.

An even more specific object is to provide such apparatus wherein said student stations are additionally equipped with a student quiz response means and said teacher's console is provided with a separate student response indicator for each of said student stations, so that in the automatic mode, each student may attempt to select the correct answer to a multiple choice question presented by the pre-programmed material and the teacher and the students are then automatically informed whether the selected answer was correct or incorrect.

Additional objects, purposes, and advantages of the invention will be evident to those skilled in the art in view of the preferred embodiment of the invention illustrated in the accompanying drawing and described in detail hereinafter.

BRIEF DESCRIPTION OF THE DRAWINGS

FIG. 6 (comprising subfigures 6a and 6b) illustrates more or less to scale the actual layout of a preferred embodiment of the front panel for the teacher's console shown diagrammatically in FIG. 4, with FIG. 6a showing the left hand portion of the panel and FIG. 6b showing the right hand portion of the panel.

Figure 1:
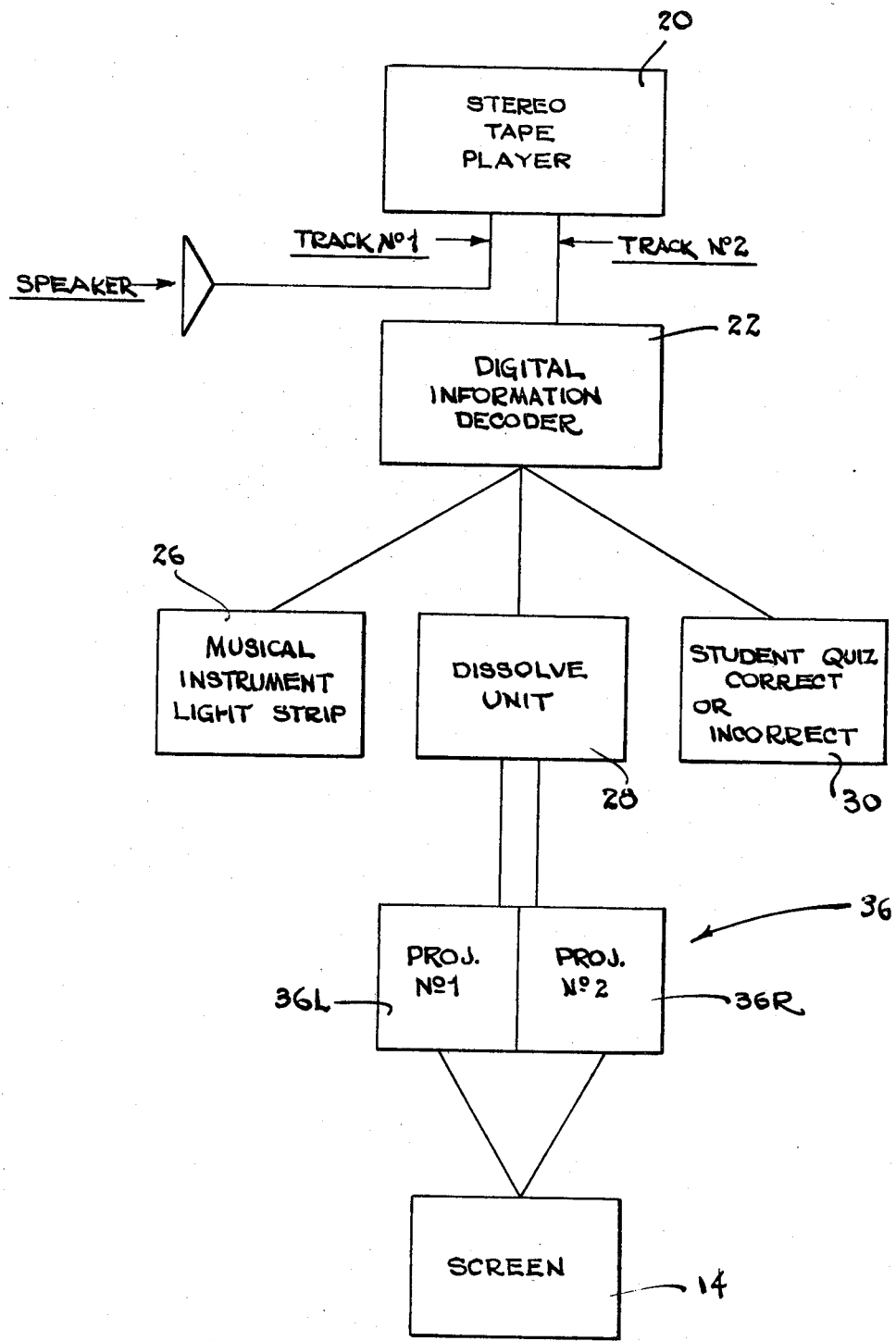
FIG. 1 is a block diagram of the pre-programmed portion of the invention showing the use of a two-track tape playback unit.

Referring generally to the invention, the illustrated embodiment shows the use of programmed audio-visual inputs simultaneously to individual musical instrument learning centers which typically include the instrument-related light strip adjacent the keyboard, a student quiz panel, a printed lesson manual, and a viewing screen located at the student learning center or placed in a central position to be viewed collectively by all the students. Additionally, each student learning center includes a set of earphones to be worn during the course of the lesson. In some teaching room configurations, a loudspeaker may be used instead of earphones.

The various inputs from the programmed part of the teaching system include a pre-recorded audio input to the earphones, a series of prearranged note combinations to the light strip, periodic questions and confirmation of correct or incorrect answers to the student quiz panel, and preferably two series of slides which are alternately projected in sequence on the screen in accordance with pre-determined dissolve time periods as one picture phases in and another phases out.

The non-programmed communication inputs to each student include their own musical performance, the activation of the student light strip by the teacher's keyboards, and the teacher's broadcast of oral instructions.

The teacher monitoring features of the present method and apparatus include selective listening of individual student's musical performances, and collective monitoring of all student quiz panels to determine those giving incorrect answers. Additionally, the printed lesson materials include visual indicia of musical notations and concepts correlated with the audio-visual programmed materials, and the instructor has a follow-along set of such student materials. Follow-along instructor monitoring of the pictorial illustrations and diagrams projected on the screen is also provided.

This unique combination of programmed and individualized teaching is designed for any musical instrument where single tones are played as in woodwind instruments and the like and is especially well suited for multiple tone instruments such as guitars, pianos and organs. The apparatus for the audio-visual programming of the presently preferred embodiment includes a magnetic tape stereo playback unit preferably having two or more channels, a digital information decoder unit, a dissolve unit, student instrument light strips, two slide projectors, a projection screen, student quiz panels and a master control console for activating and controlling the operation of the aforesaid components. The teaching program software includes two sets of slide pictures, a prerecorded two-track tape, and printed lesson materials, all correlated and coordinated with one another. By providing an instructor with high quality programmed lesson materials designed for use in this system, the instructor is able to supplement the programmed instruction with individual monitoring and inputs to the students within a time-span that is believed to be shorter than any other known method of teaching music instruction.

Figure 4:
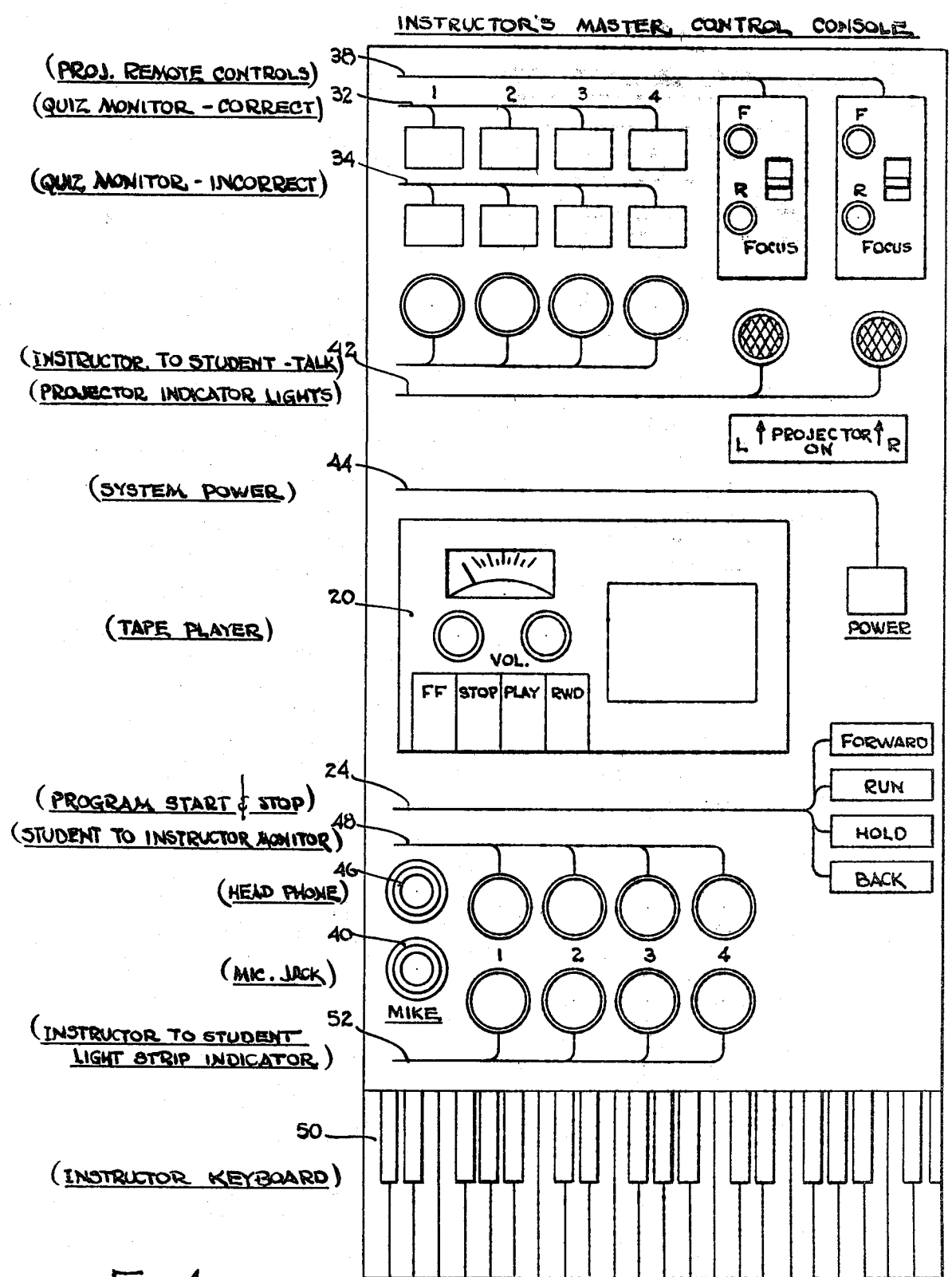
FIG. 4 is a diagrammatic representation of an exemplary teacher's console as contemplated in FIG. 2.

Referring more specifically to the block diagram and diagramatic representations of FIGS. 1 and 4, the two channel (e.g. "stereo") magnetic tape playback unit 20 provides two separate output signals. The first output is the preprogrammed audio instruction and this is played back to the students via individual headsets or speakers or else by means of a public address system. The second output channel contains encoded command data in digital format which is decoded by a digital information decoder 22. Both channels of tape playback unit are controlled by the instructor at the master control console 24 and can be stopped or started at any time during the program by the instructor. It would also be possible to include high speed forward and reverse tape controls which could also automatically cause the slide trays to move forward or backward correspondingly.

A musical instrument light strip 26 is provided for each student instrument and is preferably made up of small fourteen volt lamps, although other visible indicators such as light emitting diodes (LED's) could also be used. Each lamp of the strip is on a separate circuit with a common ground to all. Each strip is plugged into the decoder 22 with its own conventional slot keyed connector or plug (not shown) which may be wired to one another that the first lamps on all the strips are activated simultaneously, as are all the second lamps, and so on. The decoder unit will upon command activate singly or in various combinations the lights on each strip. The light strips can be varied in length and number of lights depending on the musical instrument which is being taught, and are used to display to the student the proper notes and fingering for that particular instrument.

The digital information decoder 22 also sends control dignals to a visual program control device, identified here as a dissolve unit 28. This dissolve unit is capable of a "quick-cut" change whereby the screen image is alternated from one projector to another very quickly. It is also capable of delayed dissolving from one projector to another by slowly lowering the projecting lumens on one projector while raising the lumens on another. The effect of such a conventional technique is to lap a picture on another while changing images. The dissolve durations preferably range from two seconds to fifteen seconds for maximum flexibility. Alternatively, a standard small and relatively inexpensive commercial audio-visual unit may be controlled directly by the decoder.

Figure 3:
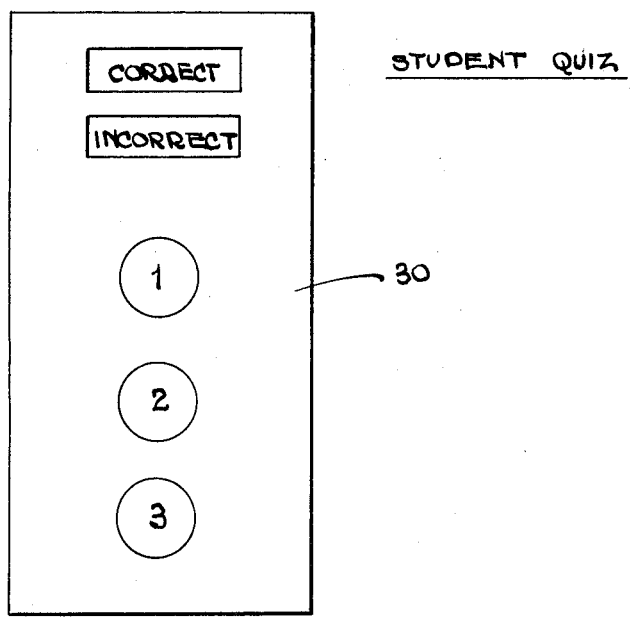
FIG. 3 is a front elevational view of an exemplary student quiz display panel.

It is necessary, as in most teaching endeavors, to test the student at various intervals in his course of study. Testing is accomplished in the following manner: all questions are multiple choice presented in video (slides or pictures), in audio (tape), and at various times with both audio and video. Each student has a student quiz panel 30 (FIG. 3) mounted at his learning stations equipped with three buttons which are labeled 1, 2 and 3. When a question is asked, the student has a choice of one out of three answers represented by the three buttons. The student indicates his choice or answer by pushing the appropriate button. If a student has chosen the right answer, as preprogrammed on the encoded digital command data channel, the indicator light on his panel and the corresponding monitor light 32 on the instructor's control panel (FIG. 4) will show "correct". If a wrong answer is chosen, an indicator light will show "incorrect" on his panel and also on the instructor's console panel. Preferably, these "correct" and "incorrect" lights are green and red LED's respectively.

Two projectors 36 are preferably used which preferably are equipped with universal slide holders having eighty or more compartments. When a signal to "show" is given from the digital information decoder through the dissolve unit to one of the projectors, the lamp in the projector comes on and the picture on the slide in the slide tray is projected on the screen. The lamp may come up slowly, so as to fade-up the picture on the screen or it may come up full intensity, depending on the command sent from the digital information decoder through the dissolve unit to the projector. When a signal is received by the dissolve unit from the digital information decoder to change from one projector to the other, the projector which has completed showing a picture will advance to the next slide with its lamp out or "dark" and the alternate projector is then on "show"

and this picture appears on the screen. This happens automatically unless a specific signal is sent to prevent the advance of the slide tray or holder. In the event of this signal, the lamp goes "dark" but the slides do not advance.

The teacher master control console is the controlling station for all of the apparatus. Beginning at the top of FIG. 4 are shown first of all projector remote controls 38 to allow the teacher to rapidly advance or reverse the projector slides as desired. The quiz monitor—correct lights 32 is a bank of lights (shown here as four in number for illustration purposes only). Each light represents a student learning station and corresponds to the "correct" lights of the student quiz panel located at a learning station; lights 32 are used to indicate to the instructor which of all of the students have chosen a correct answer to any given question. Similarly, a bank of "incorrect" lights 34 is also provided.

When a group of students are being given the programmed instruction simultaneously, they are listening to the audio portion of programmed lesson material preferably on individual head sets, which are plugged into their learning station or instrument; however, individual speakers or even a public address audio system may be employed. The teacher is able to communicate to any one or all of the students by means of a microphone which is plugged into a microphone jack 40 on the teacher's master control console. The four circles 41 labeled Instructor to Student-Talk represent switches to each learning station or instrument (shown here as four in number for illustration purposes only). The teacher can select to communicate to an individual student by pressing the proper switch to that learning station. The teacher can also select to communicate with all of the students in the group by pressing all of the switches.

Two projector indicator lights 42 are mounted on the teacher's console (one for each projector), to indicate to the teacher which projector is showing the picture on the screen at any given time.

A system power switch 44 is mounted on the teacher's control panel which is an on/off switch for the entire apparatus. After the system power switch is turned on, the teacher then presses the program start and stop (reference numeral 24) "run" button which starts the tape, the projectors and all other components in the apparatus. At any given time in the lesson, the teacher may select to pause the apparatus for verbal instructions to the students by pressing the "Hold" switch.

The teacher may choose from time to time to monitor or listen to one or all of the students at their learning station or instrument. This is done by the instructor plugging a head-set into a head phone jack 46 and selecting the appropriate one of the switches 48 (shown here as four in number for illustration purposes) that is connected to the particular student instrument or learning station. In this manner, the teacher can listen to a student's musical performance without interrupting the programmed lesson.

Figure 2:
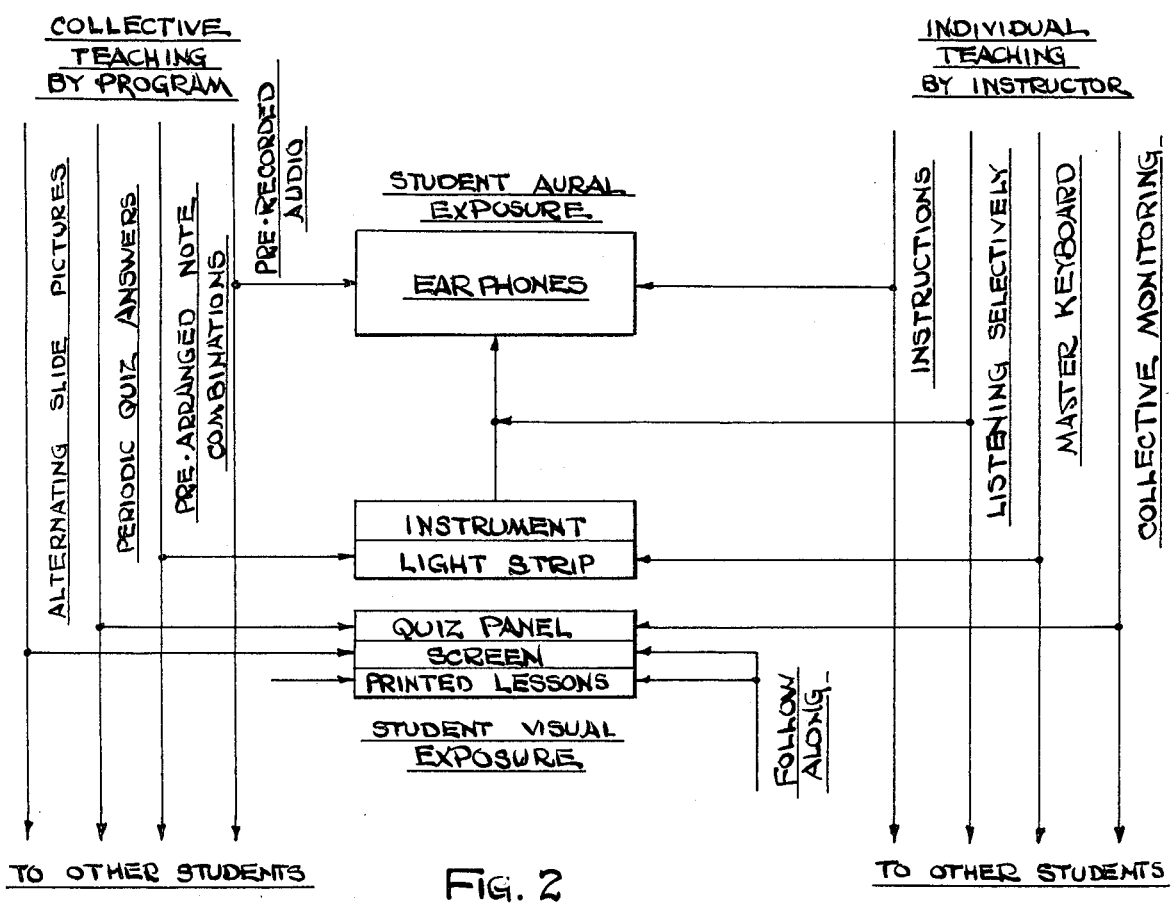
FIG. 2 is a communication diagram showing the programmed teaching inputs to an individual student learning station, as well as the monitoring and supplemental contacts by an instructor.

The teacher may choose to "pause" the apparatus at given times and reinforce the instruction by indicating what keys or notes the student should be playing. This is done by means of Hold switch 24 and a teacher's keyboard 50 (a piano type of keyboard is chosen for illustration inasmuch as all of the notes of the chromatic scale can be played on a piano keyboard). This keyboard is mounted on the teacher's console and is wired through the digital information decoder and into each of the light strips 26 at each student's learning station or instrument. A series of switches 52 are placed above the teacher's keyboard and by either opening one to a specific station or opening several of the switches to the learning stations, the teacher can press on the correct keys or notes and these keys or notes will be displayed on the musical instrument light strip at one, several, or all of the learning stations. With the aid of such a system, it is possible for a music instructor to relay information to a student or a group of students in such a clear and concise manner through audio instruction, visual pictures and corresponding light indicators related to the musical instrument being taught, that instruction time for the student is greatly reduced, complete understanding by the student is enhanced and it is possible to efficiently instruct a larger number of students at one time than is possible by an other instruction method presently known. This is shown diagrammatically in FIG. 2. Referring specifically to that figure, it may be seen that each student is exposed to "collective preprogrammed instruction" comprising prerecorded audio instructional material (which he hears through his earphones) predesignated note combinations (which are made visible by the lights trip above his student station keyboard) and by visual instructional material in the form of slide pictures (which he sees projected on a central screen), there also being keyed to the visual and audio lesson materials a series of quiz questions (which may themselves be presented as audio or visual or both) for which each student must select the correct one of three possible answers on his individual quiz panel and then (since the "correct" answers have been preprogrammed) he receives automatically positive or negative reinforcement in the form of a correct or incorrect quiz answer light on his panel. In addition, of course, he hears himself play and can compare his playing with what has been prerecorded.

Furthermore, and most importantly, the student is also exposed to "individual teaching by a live instructor." The instructor is able to communicate orally directly with the student (individually or as a group) and visually by means of the keyboard on the teacher's console which drives the lights on the light strips 26 at the student stations. Furthermore, the teacher is able to listen selectively to the individual performances and, by means of the quiz monitor lights on the instructor's console, is able to monitor whether or not the students are properly comprehending the preprogrammed lesson material.

Figure 5C:
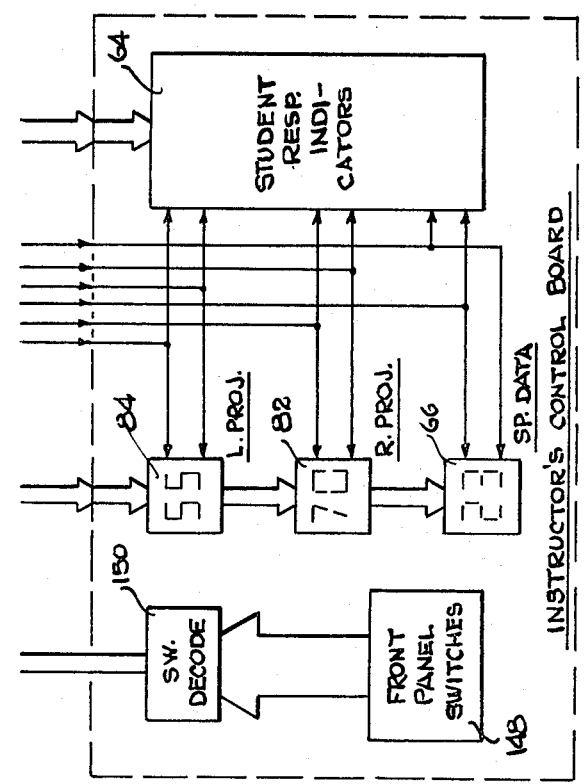
FIG. 5 (comprising subfigures 5a, 5b, 5c and 5d arranged as indicated) is a functional block diagram of a preferred embodiment of the apparatus of the present invention, showing inter alia how the decoder function of FIG. 1 may be implemented.
Figure 5:
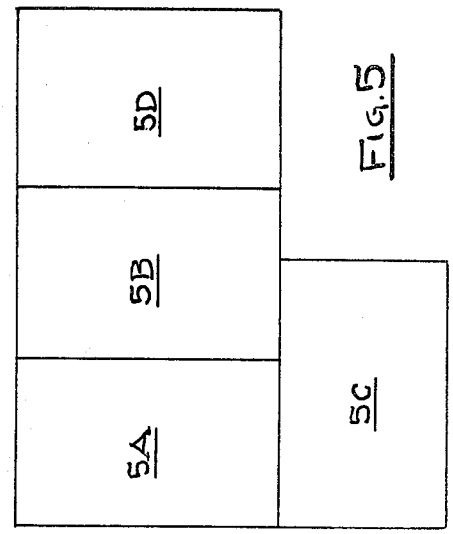

Referring now specifically to FIG. 5 which, as indicated, actually comprises four separate FIGS.—5a, 5b and 5d, oriented vertically and laid out from left to right, and 5c oriented horizontally below 5b. When the four separate subfigures are so arranged, it may then be clearly seen how the data and control signals flow from elements in one of the subfigures to elements in an adjacent subfigure.

Commencing at the bottom left of FIG. 5 (the left hand side of FIG. 5c), it may be seen that power in the form of a standard AC line voltage is supplied to the system at reference numeral 100. It is then converted to the necessary voltages and polarities required for the operation of the various components of the system by internal power supply 102. Also contained within the dashed area 104 representing the AC line voltage control portion of the system is a motor control circuit 106 (which might take the form of an electro-mechanical relay) for turning the power to a tape player 20 on and off and thereby causing the tape to stop or start. Also contained within AC line voltage control section 104 is a triac and relay drive circuit 108 (the brains of the so-called dissolve unit 28) for operating the two slide projectors 36R and 36L via cables (indicated schematically at 110). As schematically shown, the control circuit 104 is connected with the main system processor (decoder) circuitry 22.

Cable 110 not only supplies the various currents and voltages required for the proper operation of the various components located within the processor itself, but also control signals from the processor board to the tape player motor control circuit and to the projector triac and relay drive circuits. It may be noted that tape player 20, as indicated, receives the power required for the operation of its motor and electronics from motor control circuit 106.

Shown diagramatically as outputs from the tape player 20 are a first audio channel 112 and a second encoded digital command data channel 114. As shown in the Figure, the audio output from the tape player is fed directly to a loudspeaker 116. However, as has been noted previously, it may be preferable to provide audio instruction to the individual students by means of individual headphones, thus reducing the overall noise level in the classroom, and also permitting the instructor to communicate with the students individually.

The second channel, (the encoded digital command channel 114) is fed directly to the decoder processor board at the point indicated by the reference numeral 118, where first it is preprocessed by a bi-phase synchronization circuit (shown at reference numeral 120) which separates the tape player's audio frequency output into a serial stream of binary data 122 and "clock" signals 124 and 126 which indicate to control switch input circuit 128 whether or not a binary bit of command data from tape player 20 is then present on line 122. The encoded command data is then assembled into an eight bit word by series-to-parallel converter circuit 130 which, upon series to parallel read enable line 132 being enabled, causes the encoded data from tape player 20 to be put on main micro-computer data bus 134 and thus be made available to main micro-computer 136 for processing.

Also associated with main micro-computer 136 is an address latch 138 under the control of an address latch enable line 140 whose input is also said data bus 134 and whose output is to a second data bus 142 which is connected to memory A (designated by reference numeral 144). Memory A is under the control of a memory A read enable line 146 which, upon being enabled, will cause the data word stored in memory at the location specified by the address in address latch 138 to be placed on data bus 134 and thus made available to the main micro-computer.

When it is desired to read the contents of a different address in memory A, all that is necessary is for the main micro-computer to designate the new address on data bus 134 to latch 138, which, upon the enabling of address latch enable line 140, will then store the new address for use in reading data from memory A in a subsequent read cycle.

Also serving as a data input to main micro-computer 136 is data from control switch input circuit 128. The encoded front panel switch data from front panel switches 148 is decoded by switch decoder circuit 150 and fed to the processor by means of bus 152 and control switch input circuit 128, and serves as control data inputs to main micro computer 136 along with the "automatic" control data supplied by series to parallel converter 130 from the tape player data channel output.

Thus it may be seen that the main micro computer 136 has as its principal data inputs both preprogrammed command data contained on tape player second channel 114 and the manual data supplied by the instructor by means of front panel switches 148.

It will be recalled that the said front panel switches comprise a tape player stop switch 70, a tape player start switch 68, a keyboard light strip clear switch 78, a left projector forward switch 86, a left projector reverse switch 88, and the corresponding forward and reverse switches for the right projector. Since intercom selector switch 90 and press-to-talk switch 96 relate solely to the audio subsystem (shown in FIG. 5 schematically as an audio bus 112 and a speaker 116), it is clear that these latter two switches are not among the front panel switches that control the operation of main micro computer 136. Main micro-computer 136 operates under the control of a program stored in memory 144 and has as its principal function the decoding of various command data and separating it into (1) data related to the control of tape player 20 and projectors 36R and 36L (output on output line 154, conditioned by output drive circuit 156, whence it is available to the line control circuit 104 via bus C 158) and (2) the command data relating not directly to the control of said tape player and said projectors, but rather to the keyboard indicators 26, the remote response indicators 160, the student response switches 162 of student quiz panels 30, the student quiz response indicators on the instructor's console 64, the instructor's keyboard 50 and its associated light strip indicators 62, and digital displays 66, 84 and 82.

This latter class of command data is not processed to any great extent by main micro-computer 136, but is rather merely output on I/O bus 134 to command data latch 164 in which it is stored in response to a command data latch write enable signal being present on line 166, which also activates a one shot 168 whose output via bus A 170 is detected by data input detector 172, thereby allowing the slave micro-computer 174 to read the contents of the command data latch 164 via bus A 170 and command data input port 176, data input detector circuit 172 supplying an interrupt signal on line 178 to the interrupt port of slave micro-computer 174 upon interrogation by program line 180. Slave micro-computer 174 is also under program control, the relevant instructions being stored in memory B (indicated at reference numeral 182) with the address of the relevant instruction being loaded into address latch 184 (upon address latch enable line 186 being enabled) via slave micro-computer bus 188, said data bus also serving for the transmission of command data from input port 176 to the micro-computer itself.

Slave micro-computer 174 is responsible for maintaining the various displays associated with the teaching system in accordance with command data provided by tape player 20 via main micro-computer 136 and command data input port 176, and also in response to manual inputs from the individual students in the form of responses on their quiz panels 30. With respect to the instructor's keyboard 50, it might be noted that by depressing CLEAR switch 78 on front panel 60, the instructor does not necessarily "communicate" directly with slave micro-computer 174, but rather merely effects a direct connection with student keyboard indicator light strips 126, temporarily disconnecting them from keyboard indicator latch 190.

In the automatic mode of operation, keyboard indicator latch 190 receives its inputs from slave micro-computer 174 via data bus 192 in the form of an 8 bit word. Since a total of 63 bits are necessary to specify which combinations of the 63 indicator lights (provided above the instructor's keyboard and above the individual student keyboards) are to be illuminated, latch decoder 194 in response to another 3 bits of information provided by output line 196 and keyboard latch decoder write enable line 198 specifies to keyboard indicator latch 190 into which of eight different groups each of 8 bits the data contained on bus 192 is to be read. Slave micro-computer 174 is also provided with an input response and multiplexor latch 200 (which is under the control of latch read line 202 and latch write line 204), which is connected not only to the individual response switches 162 but also to output display multiplexer 206 and, via data bus 192, to response indicator latch 208 provided with a write enable line 210. Multiplexer 206 determines which "column" of student stations the remote response indicator data contained in response indicator latch 208 pertains to, and at the same time, which digit of which digital display that the data from display decode and drive circuit 212 pertains to. In the interest of simplicity, and in order to save power, the data supplied to the various student station light strips 26 is also time domain multiplexed by means of multiplexer 206.

Figure 8:
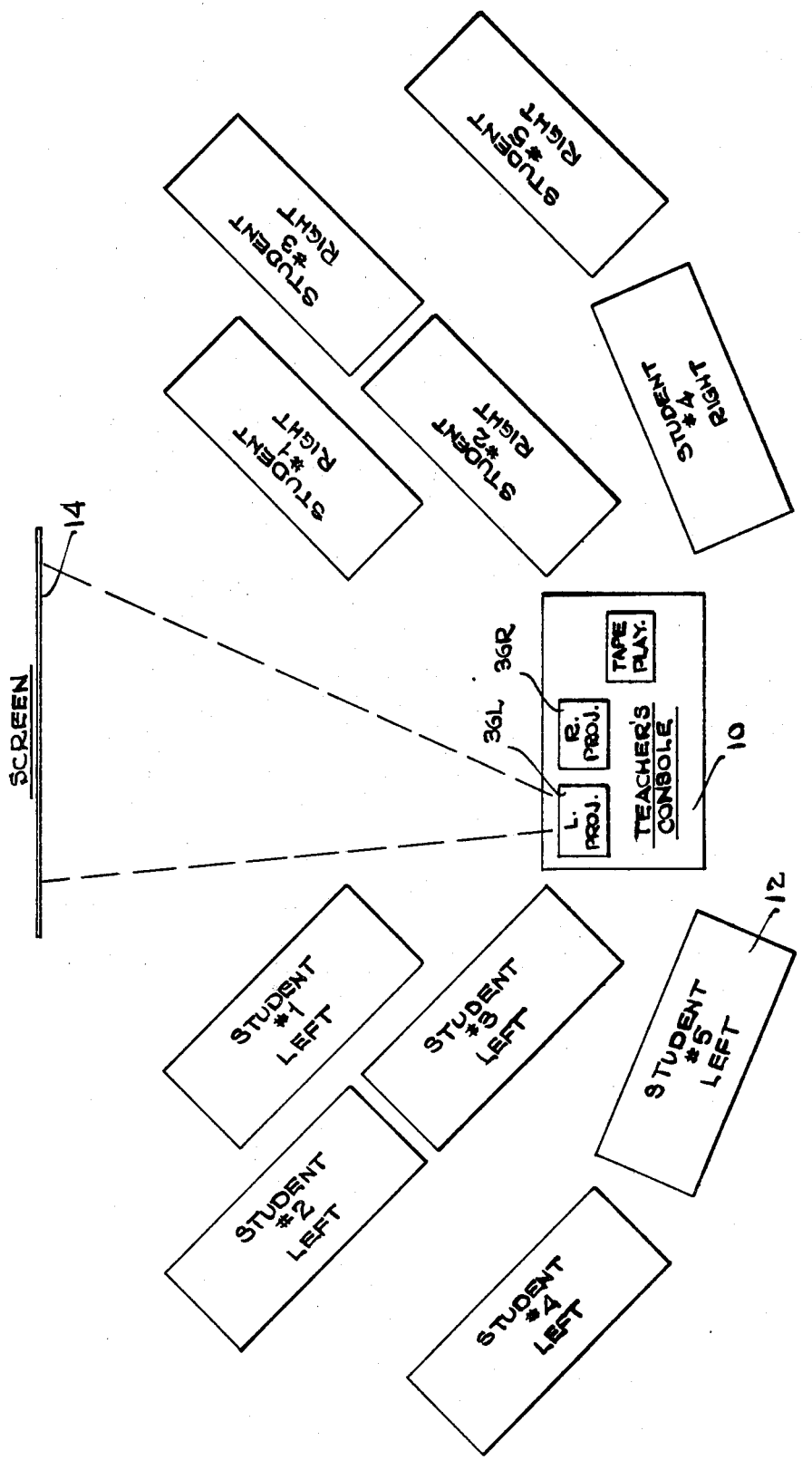
FIG. 8 is a plan view of an exemplary classroom set-up using the apparatus and method of the present invention.

FIG. 6 illustrates—more or less to scale—the layout of a preferred embodiment of a control panel 60 for the teacher console 10 shown in FIG. 8 and specifically intended for use with up to 10 student stations (five on the left and five on the right).

Figures 6A, 6B:
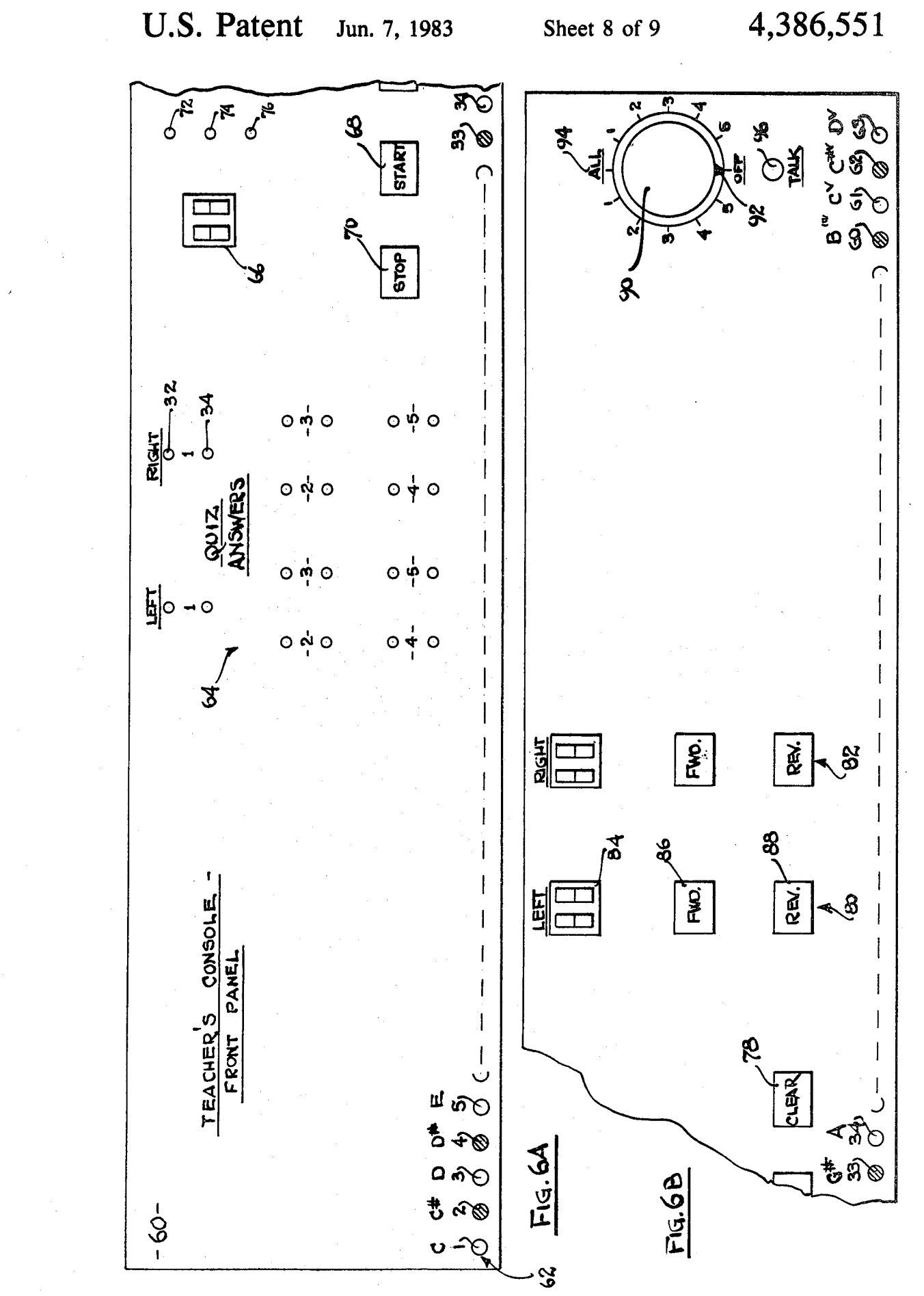

It should be noted that FIG. 6 is comprised of 2 separate figures: FIG. 6a which shows the left hand side of said panel and FIG. 6b which shows the right hand side. Along the bottom of the control panel (indicated generally by the reference numeral 60), is an instructor's light strip 62 which is essentially identical to the student's station musical instrument light strips 26 discussed previously and which, in the embodiment illustrated, comprises a total of 61 individual lights for use with an instrument such as an electric piano having five full chromatic octaves plus one additional note.

For the instructor's convenience, the individual lights in the light strip may be numbered sequentially (i.e., 1, 2, 3, 4, 5 . . . 59, 60, 61). They may also bear the letter designations of the corresponding notes (i.e., C, C, sharp, (also known as D flat) D, D sharp, (or E flat) E, F, F sharp (or G flat), G, G sharp (or A flat), A, A sharp (or B flat) B), and then the same notes but at an octave higher (indicated by the use of a single quote or prime symbol), followed by the notes in the third octave (indicated for example, by means of a double quote or double prime symbol), then the notes in the fourth octave (indicated by the use of a triple quote or triple prime symbol), then the notes in the fifth octave (indicated by a quadruple quote or quadruple prime notation) and then finally the first note of the sixth octave.

Also for the convenience of the instructor, those lights which correspond to the notes of the C major scale (the white keys on the piano) are indicated by lights of one color (in the Figure, unshaded), while those lights corresponding to the so-called accidental motes (i.e. the notes of the chromatic scale which are foreign to the C major scale) have their corresponding lights in a different color (in the Figure, indicated as shaded).

Arranged in an array on the left hand portion of panel 60 are the student quiz answer monitor lights 64 which, as have been noticed previously, comprise a plurality of correct lights 32 and a plurality of incorrect lights 34. In the case of the illustrated embodiment these lights have assumed the form of light emitting diodes (LED's), with the correct lights 32 being green in color and the incorrect lights 34 being red in color. Furthermore, by comparison with FIG. 8, it may be seen that the spatial arrangement of the quiz answer monitoring lights 64 is the same as that of the student stations 12 with the stations on the left having their corresponding lights also to the left, with number 1 LEFT in the first or top row, numbers 2 LEFT and 3 LEFT in the second or middle row, and numbers 4 LEFT and 5 LEFT in the third or bottom row, while on the right hand side, number 1 RIGHT is in the first row, numbers 2 RIGHT and 3 RIGHT are in the second row, and numbers 4 RIGHT and 5 RIGHT are in the third row.

To the right of quiz monitor lights 64 is a two-digit segmented numerical display 66 which has as its purpose to indicate to the instructor the number for the tray of slides that is to be placed into the projector at the start of a particular instruction tape. Once the designated tray has been loaded into the projector (actually two separate trays, a left tray and a right tray, since in the preferred embodiment two projectors, each having its own tray are utilized) the tape player 20 (and the automatic control of the system) is then restarted by means of START control button 68. Adjacent tape player START button 68 is a STOP button 70. Tape control buttons 68 and 70 correspond respectively to the RUN and HOLD program start and stop buttons 24 of FIG. 4. However, in the specific embodiment of the instructor console control panel 60 shown in FIG. 6, there is no provision for an automatic fast forward or fast reverse operation.

Above and slightly to the right of STOP button 70 and Start button 68 are three LED's designated respectively "STOP" (LED 72) "START" (LED 74) and "ERROR" (LED 76). Preferably the START LED is green in color and the others are, for example, red. STOP LED 72 and Start LED 74 indicate respectively whether tape player 20 is in its stop or start mode of operation, while ERROR LED 76 indicates to the teacher if decoder 22 has detected an apparent error in the digital command data as read by the tape player. Such an error might have had the effect of causing one or both of the projections to lose synchronization with the audio track, or the individual lights on the light strips to indicate the wrong note or combination of notes, or even possibly for a wrong answer to the quiz question then being presented to the students to be treated as the correct answer. The instructor has the option, upon such an error being detected, of then stopping the automatic preprogrammed instruction (e.g., by means of STOP button 70) or continuing (e.g., by means of START button 68).

Furthermore, adjacent said START button 68 (visible at the left hand portion of FIG. 6b) is a CLEAR button 78 which has the effect of clearing the combination of lights visible on the various light strips and enabling the teacher himself to set up any desired light strip displays from the keyboard contained in the instructor's console. When the teacher is finished with such special displays on the light strips and the tape has again been started, the preprogrammed keyboard light strip display pattern is again automatically made visible and the preprogrammed instruction resumes.

After the lesson is underway, the segmented digital display 66 is utilized as a "backward clock" and indicates to the instructor how many minutes of preprogrammed material is left in that particular lesson.

To the right of the program Start and Stop controls and related buttons, two columns of display and control buttons, the first such column bearing the designation "Left" and indicated generally by the reference numeral 80, the other such column bearing the designation "Right" and designated generally by the reference numeral 82. These two columns are identical in function, one being associated with the left hand projector 36L, the other being associated with the right hand projector 36R. Accordingly, only Left column 80 will be discussed in detail.

At the top of the column is a two digit segmented digital display 84 which is used at the beginning of a lesson to indicate automatically to the instructor which slide number is to be the first slide shown from that projector during the course of the lesson. As the digital commands in the tape continue to be read and the preprogrammed lesson is underway, this display is automatically updated to indicate to the instructor which slide should currently have been automatically positioned in the left hand projector.

In the event of an error in projector operation, the FORWARD switch 86 and the REVERSE switch 88 may be used by the instructor to move the tray forward or reverse one slide at a time. Normally, these switches are used only if an error has been detected in the automatic operation of the system. However, while the tape player has been stopped, these buttons may also be used by the instructor in a manual mode of instruction, and certain visual material from an earlier part of a lesson may be repeated, but with the teacher himself explaining the significance of the slide to the students.

Referring now to the extreme right hand side of control panel 60, it may be seen from FIG. 6b that there is provided a selector switch 90 having a pointer 92 that may be rotated from the OFF position shown to one of the numbers 1 through 5 on the left hand side of the selector switch (designating one of the five student stations to the left of the instructor's console) or, alternatively, to one of the five numbers 1 through 5 on the right hand side of the selector switch (designating respectively one of five student consoles located to the right of the instructor), or to the top most portion 94 designated "ALL", wherein the teacher is in communication with all of the students collectively.

The purpose of this selector switch is to enable the teacher to select with which student station or stations he chooses to talk to (or listen to). He thus may listen to individual student performances (or in the event that the student stations are equipped with individual microphones, to oral questions raised by the students) and talk to each individual.

In use, the instructor merely dials the selector switch to a particular student station designation. If he has individual comments to offer to that student, he presses the TALK button (designated 96). Upon release of the TALK button, the communication system between the teacher and the students is again placed in the listen mode.

Figure 7:
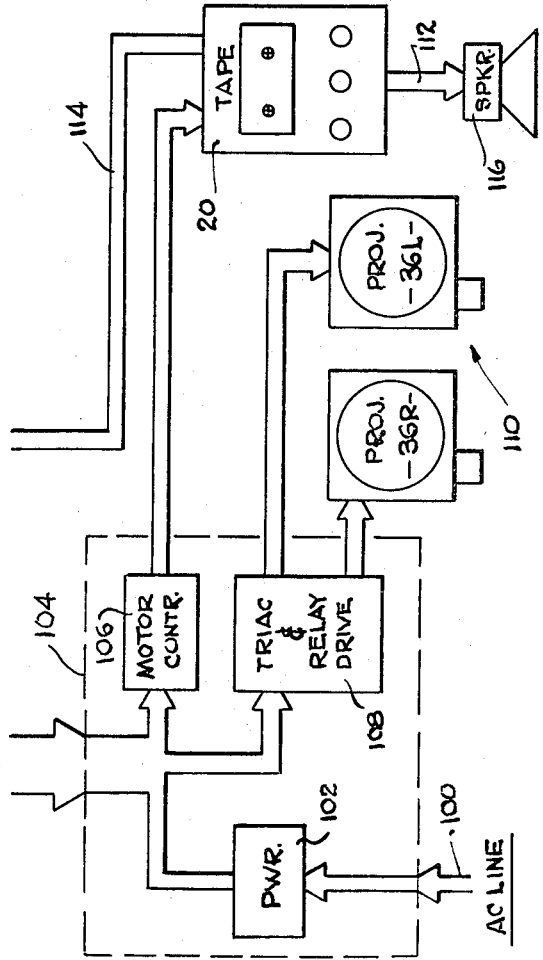
FIG. 7 is an isometric view of the keyboard side of a teacher's console wherein the keyboard, the control panel, and the individual slide projector trays are all clearly visible.
Figure 7:
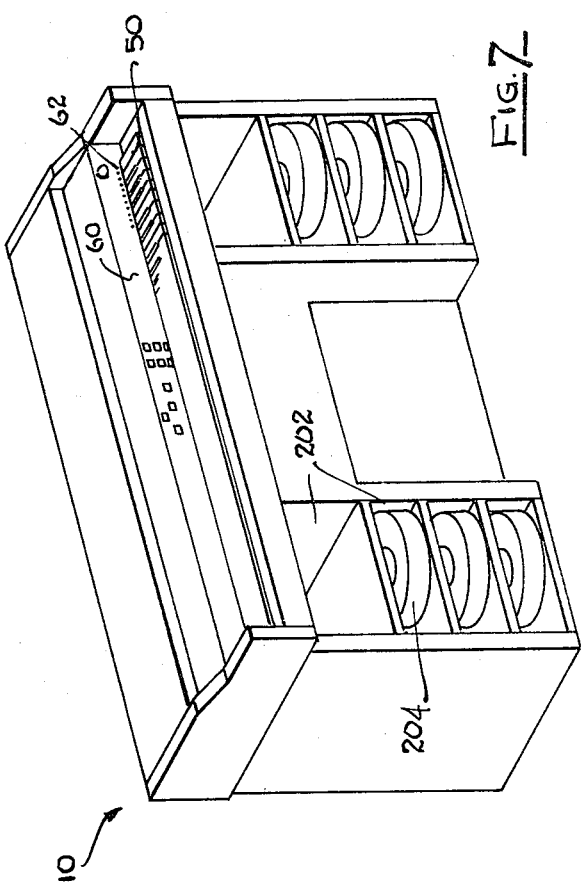
Figure 5A:
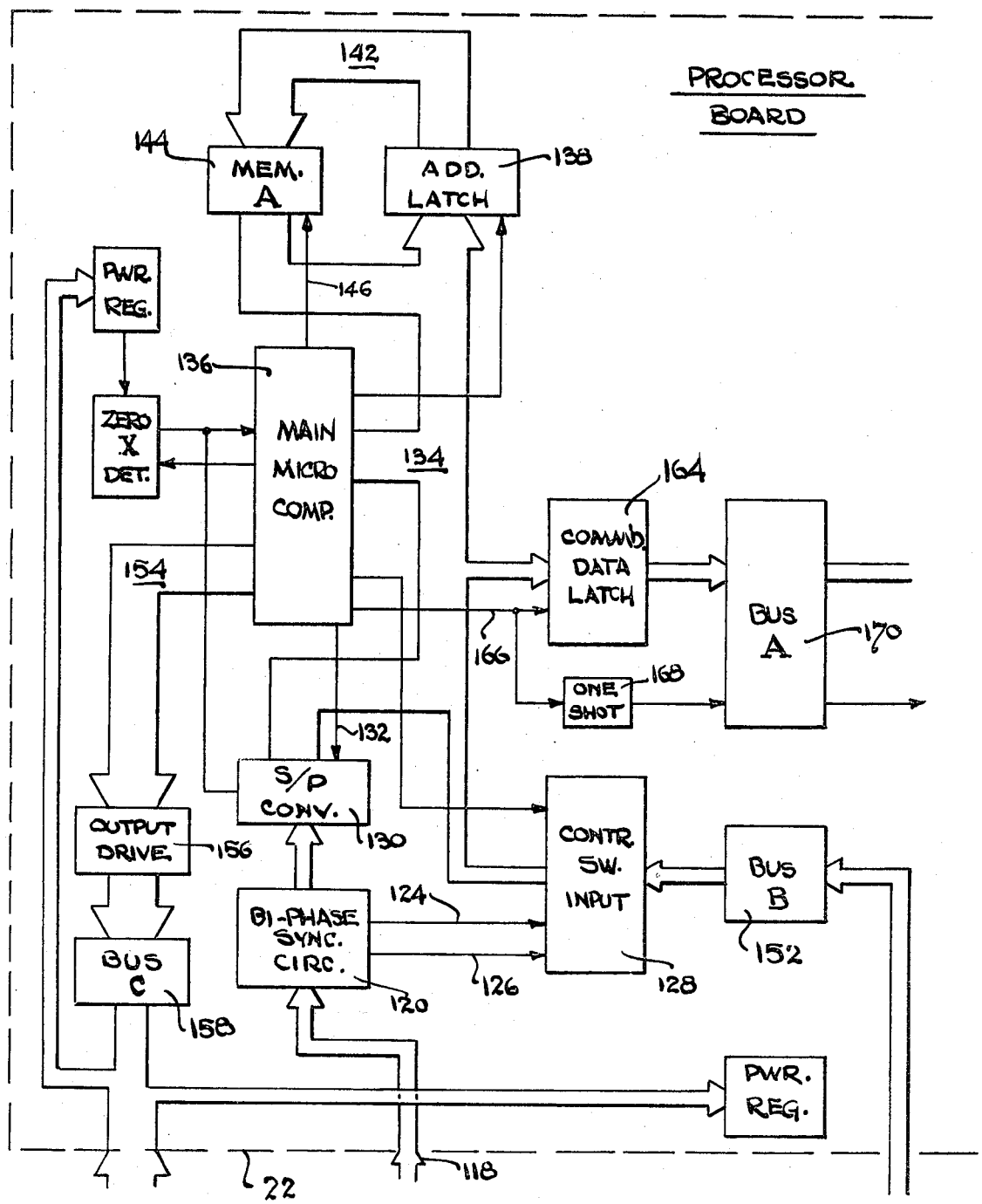
Figure 5B:
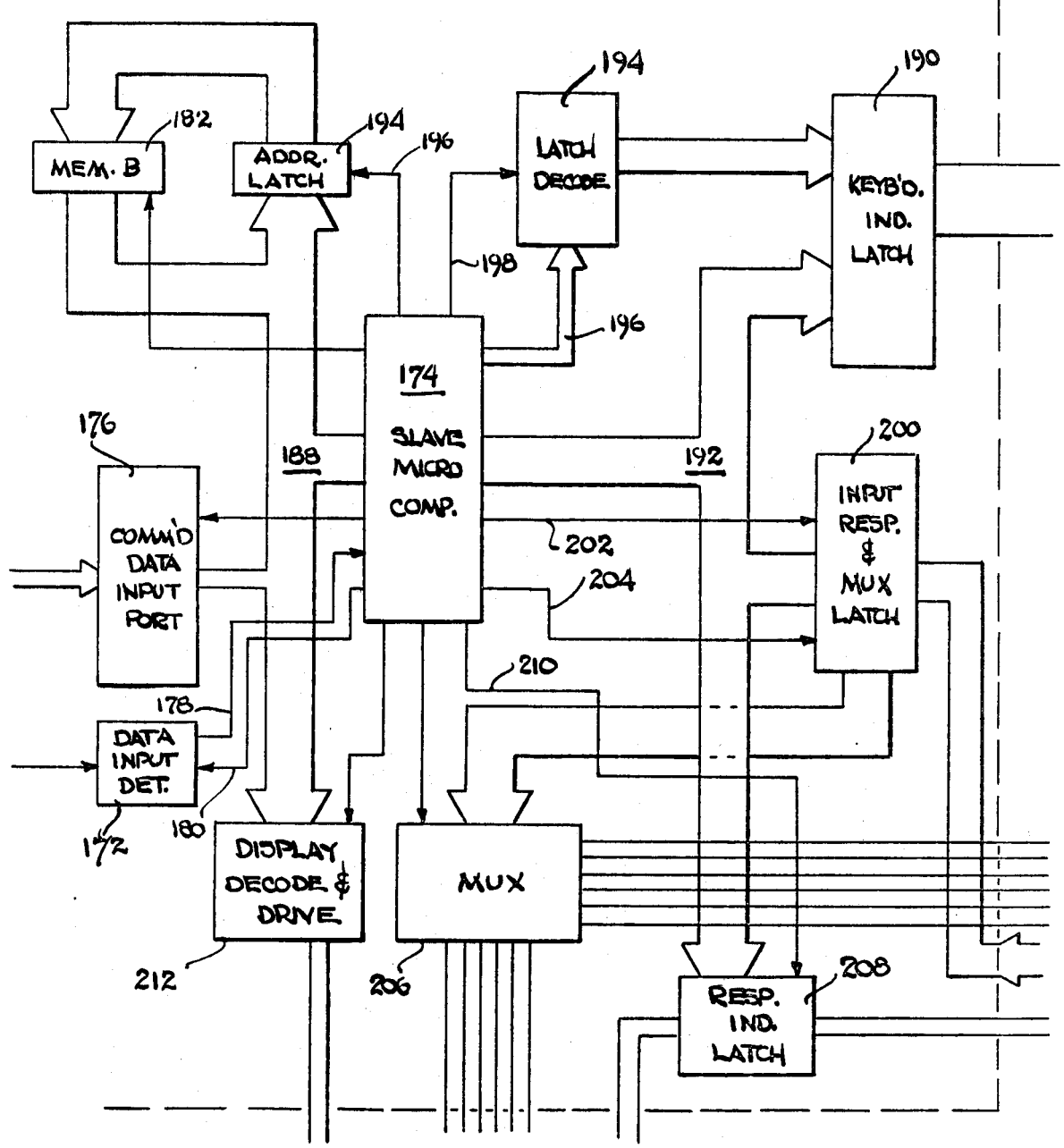
Figure 5D:
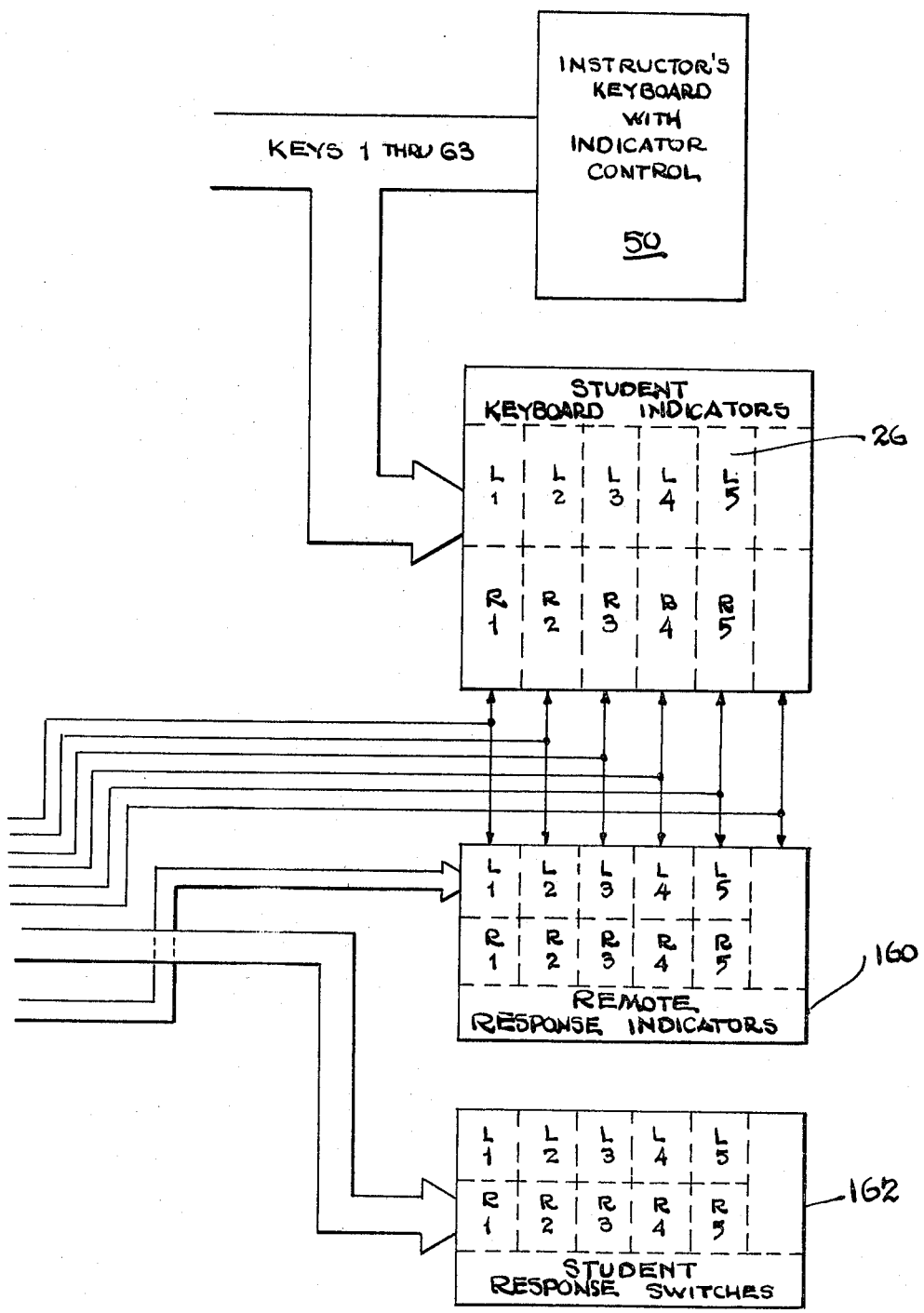

Referring now specifically to FIG. 7, which illustrates the exterior of a preferred embodiment of a teacher's console 10 usable with the present invention, wherein both the control panel 60 of FIG. 6 and the keyboard 50 of FIG. 4 are clearly visible, it may be seen that console 10 may have the overall appearance of an electronic piano or organ; however, in addition to the panel 60 a plurality of storage compartments 202, each designed to accomodate a single one of said slide trays 204, are also provided. It will be noted that three of the slide trays visible in the illustration are stored on the left side of the instructor's console and three are on the right side; however, both the top (or first) compartment on the left and the top compartment on the right are empty. The layout of storage compartments 202 is such that the slide tray to be used in left projector 36L for the first series of lessons is normally stored in the first compartment on the left, the tray used in left projector 36L for the second series of lessons is stored in the second storage area on the left, and so on. Thus, as illustrated, teacher's console 100 is presently employed in the first lessons of the series and projectors 36R and 36L (not visible in FIG. 7) have already been loaded with the appropriate slide trays.

Referring now to FIG. 8, it may be seen that in a collective teaching situation in accordance with the present invention, the teacher's console 10 is preferably utilized with a number of individual student's stations 12. In the classroom layout shown in the Figure, actually ten such student stations are used with one teacher's console, five on the left of the teacher's console and five on the right. Such a spatial distribution of the student stations has the advantage of placing the teacher in closer proximity to all of the students and at the same time allowing all of the students a clear line of sight to the screen 14 upon which, as has been previously discussed, are projected slides containing preprogrammed visual instruction materials by means of a left projector 36L and a right projector 36R, which are contained within the teacher's console 10 and are under the control of a tape player 20 also contained in the teacher's console, as has been discussed in more detail previously.

Although an exemplary embodiment of the invention has been disclosed for illustrative purposes, it will be understood that various changes, modifications and substitutions may be incorporated in such embodiment without departing from the invention as defined by the claims hereinafter.

What I claim is:

1. In an audio-visual system for combining programmed audio-visual instruction with "live" individual instruction presented simultaneously to two or more students learning to play at their own separate musical instrument stations each equipped with an associated guidance light strip, the improvement comprising:

a viewing screen at a forward portion of a teaching classroom;

a teacher's console facing forwardly with an unobstructed line of sight to said viewing screen and coupled separately and collectively through connecting wire means to the separate musical instrument stations of the students, and further including a musical instrument, slide projector means visually aligned with said viewing screen, cassette means for activating said slide projector means and for providing programmed audio-visual instruction directly to said student stations, first monitor/control means operably connected to said slide projector means and said cassette means, and second monitor/control means operably connected with each student station; and two or more individual student instrument stations facing at least partially forward and visually aligned with said viewing screen, with the student's direct line of sight to said viewing screen when the student is in playing position being in the same general direction as the student's line of sight to his or her guidance light light strip, and with the keyboard of each student instrument station independently viewable from said teacher's console, and including at least one walking path accessible to each student station without crossing over said connecting wire means.

* * * * *